A. FAY.
VARIABLE SPEED MECHANISM.
APPLICATION FILED FEB. 24, 1911.
1,170,058.
Patented Feb. 1, 1916.
2 SHEETS—SHEET 1.
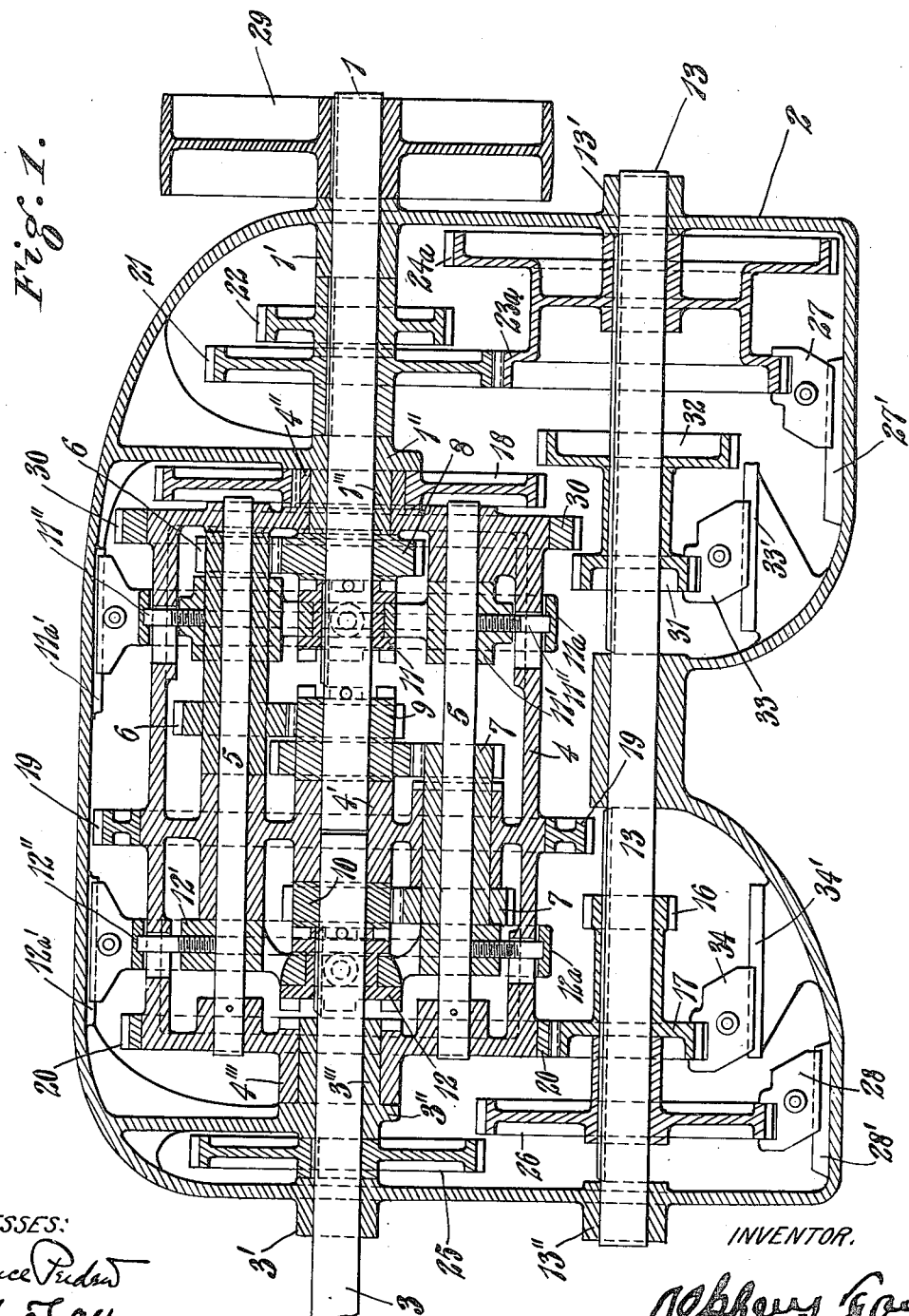

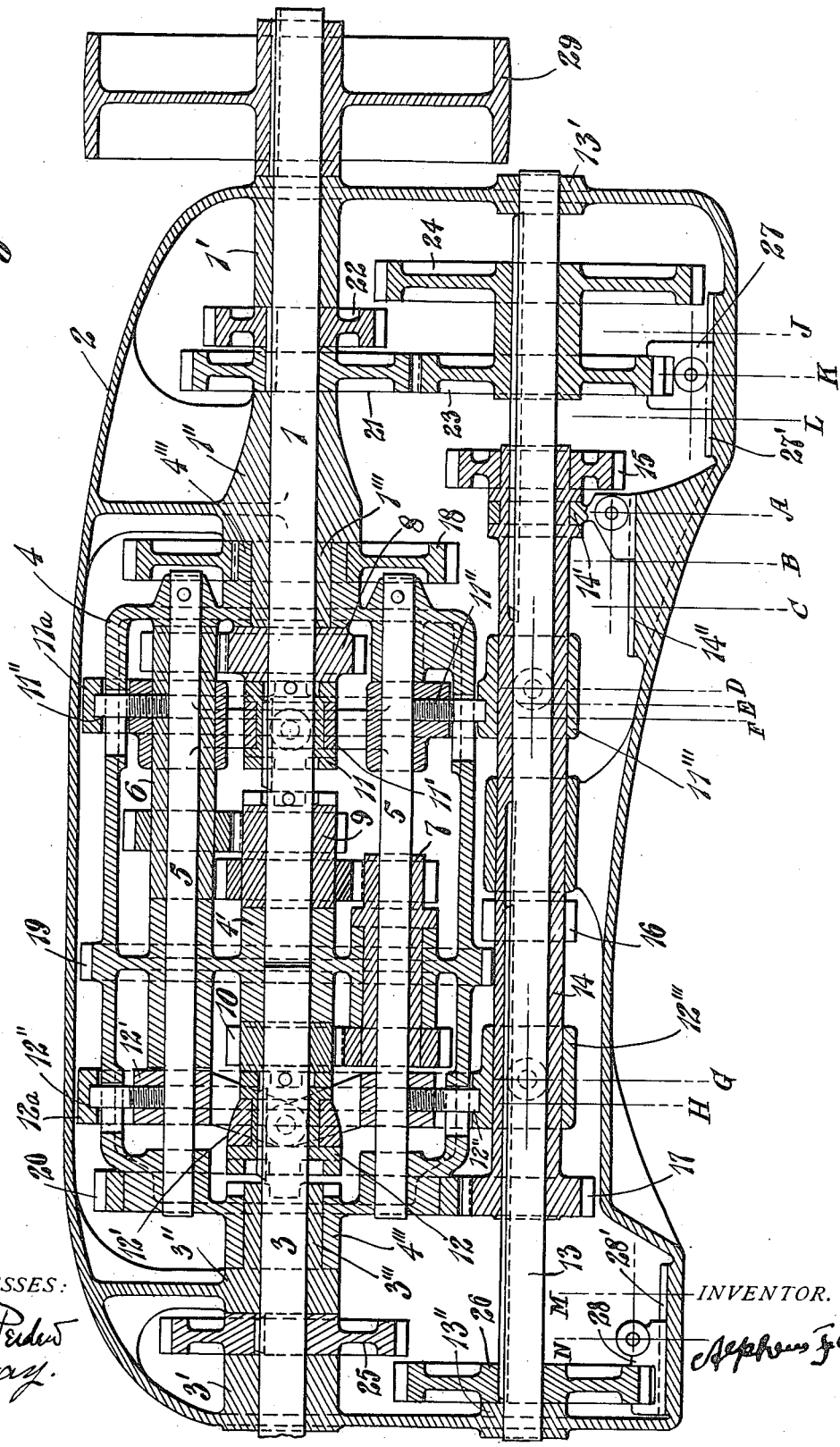

UNITED STATES PATENT OFFICE.

ALPHEUS FAY, OF LOUISVILLE, KENTUCKY.

VARIABLE-SPEED MECHANISM.

1,170,058.   Specification of Letters Patent.   Patented Feb. 1, 1916.

Application filed February 24, 1911. Serial No. 610,658.

*To all whom it may concern:*

Be it known that I, ALPHEUS FAY, a citizen of the United States, residing at Louisville, in the county of Jefferson and State of Kentucky, have invented a certain new and useful Variable-Speed Mechanism, of which the following is a specification.

My invention relates to variable speed apparatus, and has for its object the variation of speed from the motive apparatus to the operative mechanism at a uniformly high efficiency under all conditions, as well as to conveniently effect such changes of speed as are required under different conditions in performing work.

My invention consists in the parts and in the details of construction and arrangement of combination of parts, as will hereinafter be more fully described and claimed.

In the drawings: Figure 1 is a horizontal cross sectional plan view of a device embodying my invention. Fig. 2 is a similar view of device embodying a modification of my invention.

In either instance, the driving shaft 1 is journaled in bearings 1' and 1'' of the casing 2, and the driven shaft 3 is journaled in bearings 3' and 3'' in the casing. The drum 4 turns on these two shafts and has a bearing 4' for them inside. This drum 4 also has hubs 4'' and 4''' on its ends and the bearings 1'' and 3'' have extensions 1''' and 3''', respectively, on which said hubs turn. The drum 4 has two reactive shafts 5 rigidly mounted in its ends parallel to the shafts 1 and 3. The reactive shafts 5 have stepped gears 6 and 7 loosely mounted on them, the gear 6 meshing with a driving gear 8 on the shaft 1, near one end of the drum, and with the intermediate stepped gear 9, about the middle of the drum, also on said shaft 1. The other gear 7 meshes with said intermediate stepped gear 9 and with a driven gear 10 on the shaft 3, near the other end of the drum. Each of the gears 8, 9 and 10 is loosely mounted on its shaft, and can turn with its shaft only when engaged by a suitable clutch on the shaft. Thus, a clutch 11 is provided for the gears 8 and 9, adapted to engage either with one gear or the other, and a clutch 12 is provided to engage either with the gear 10 on the driven shaft or with the adjacent inside of the end of the drum 4. The clutch 11 is so arranged that it may also occupy a position midway between the gears 8 and 9, leaving them both out of operation when it is desired to throw the clutch 12 into operative engagement with the drum 4. The two examples are also alike in that they both have an intermediate shaft 13 that extends parallel to the shafts 1 and 3 and has bearings 13' and 13'' in the casing. This intermediate shaft has a series of gears that rotate with it and are provided with means for sliding them longitudinally of the shaft to selectively mesh them with a corresponding series of gears that are mounted on or rotate with the drum 4. Also, there are gears on the intermediate shaft that mesh with gears on the driving shaft 1 and there is also a gear on this intermediate shaft that may mesh with the gear on the driven shaft.

In the example illustrated in Fig. 2 the clutches 11 and 12 are moved by means of yokes 11' and 12' respectively, sliding on the reactive shafts 5. These yokes have pins 11'' and 12'' respectively that extend through slots in the walls of the drum, and travel in internal grooves in rings 11ª and 12ª, respectively, surrounding the drum. These rings have hubs 11''' and 12''', respectively, that slide on the intermediate shaft 13 and these hubs may be provided with suitable means for manually sliding them as indicated. Also in this example illustrated in Fig. 2 a sleeve 14 turns with and is slidable on the intermediate shaft 13, by means of a spline and this sleeve carries the gears 15, 16 and 17 to mesh selectively with the gears 18, 19 and 20, respectively, that are mounted on the drum 4, as above alluded to. The gear 18 is mounted on an extension of the hub 4''' while the gear 19 surrounds the drum near its middle, and the gear 20 is rigidly mounted on an extension at the other end of the drum. The sleeve 14 is moved by means of a yoke 14' sliding on a bracket 14'' on the inner side of the casing. Two gears 21 and 22 are keyed on the driving shaft 1 and two other gears 23 and 24 are rigidly joined and are splined on the intermediate shaft 13, being so spaced with relation to the gears 21 and 22 that they may make selective engagement therewith, as they are moved along the intermediate shaft. At the other end, there is a gear 25 keyed on the driven shaft 3 and a gear 26 is splined on the intermediate shaft to be slid into or out of mesh with the gear 25. The couple of gears 23 and 24 are slid by means of a fork 27 on a bracket 27' on the inside of the casing, and the gear 26 is slid by means of a fork 28 on a bracket 28', similarly located. The broken lines A, B and C indicate the different positions to be given to the sleeve 14 to effect the changes in combinations of the gears on the sleeve and on the drum. The broken lines D, E and F indicate the three different positions to be given to the clutch 11, and the lines G and H indicate the positions for the clutch 12, as above mentioned. The lines J, K and L indicate the various positions for the couple of gears 23 and 24, to mesh one or the other or to throw both of them out of mesh, as required. The lines M and N indicate the two positions of the gear 26. It will be understood that the gear 26 is only used when the gears 23 and 24 are out of mesh. Likewise, it is obvious that the clutch 11 should be in mid-position, and thus inoperative, when the clutch 12 is engaged with the drum; this leaves the series of gears inside the drum stationary, and the driven shaft is rotated simply by means of the gears between the driving shaft 1 and the intermediate shaft 13, and the gears between said shaft and the drum.

A pulley 29 is mounted on the driving shaft 1 outside the casing, for applying the power, and the driven shaft 3 may have any suitable arrangement outside the casing for utilizing the power at the different speeds obtained.

In the example illustrated in Fig. 1, the rings 11ª and 12ª are not mounted on the intermediate shaft, but slide on suitable guides 11ª′ and 12ª′ on the inside of the casing. An additional gear 30 is mounted on the drum 4, and to selectively mesh with it and with the gear 18, a couple of gears 31 and 32 are splined on the intermediate shaft 13 and slid by a fork 33 on a bracket 33′. The gears 16 and 17 are rigidly coupled and are slid by a fork 34 on a bracket 34′, so that they selectively mesh with the gears 19 and 20, as before described. The gears 23ª and 24ª correspond to the gears 23 and 24, but are formed so that they may telescope the gear 32, thus effecting a saving of space. The removal of the sleeves of the rings 11ª and 12ª permits of the movement of the gears on the intermediate shaft, so that a saving of space is thus effected, also. This saving of space not only allows the provision of the additional gears 30 and 31, on the drum and on the intermediate shaft, respectively, but allows the various coupled gears on said intermediate shaft to be so spaced that one gear of the couple is entirely out before the other enters mesh. Thus the changes may be made without stopping the apparatus, with the sliding gears as well as with the clutches, whereas only the clutches could be manipulated while the apparatus was running, in the example illustrated in Fig. 2. For these reasons, the example illustrated in Fig. 1 is deemed preferable, as being a more skilful development of the principle of my invention. Other variations in detail, of like nature, are to be anticipated in the use of the invention.

It will be understood, referring to Fig. 1, that the clutch 11 in connection with the four different combinations of the intermediate shaft and the drum will afford eight different speeds—four when engaging with the gear 8, and four others when engaging with the gear 9. Of course, when using these speeds it is necessary to have the clutch 12 engaged with the gear 10 on the driven shaft and to have either the gears 21 and 23ª, or the gears 22 and 24ª, in mesh. Now, if the clutch 11 be thrown into mid-position and the clutch 12 be thrown over to engage with the drum, causing the drum and driven shaft to rotate together, four more speeds may be had from the changes in combination of the intermediate shaft and the drum. Thus a total of twelve different speeds may be had by the manipulation of the two clutches 11 and 12 and the sliding of the gears on the intermediate shaft that mesh with the gears on the drum. When the last four speeds are obtained, the driving is effected directly through the intermediate shaft and the drum from the driving shaft 1 to the driven shaft 3, as above mentioned, but when obtaining the first eight speeds, the differential operative connection inside the drum is used, and its equalizing, balancing effect is attained in the transmission of power, according to the underlying principle of my invention, of which this device is an example, and which is original with myself. This equalizing action is obtained by the coöperation of the geared connection between the driving shaft 1 and the intermediate shaft 13, or between the driven shaft 3 and said intermediate shaft, as the case may be. Now, by means of the changes in combination that may be made between the driving shaft and the intermediate shaft, with the interchangeable gears 23ª and 24ª, the above mentioned twelve speeds may be multiplied into twenty-four speeds. Then, by unmeshing both of these gears 23ª and 24ª, and meshing the gear 26 with the gear 25, connecting the driven shaft to the intermediate shaft, the first mentioned eight speeds may be modified into eight different ones, which added to the twenty-four, will make thirty-two different speeds. The clutch 12 must be in engagement with the gear 10 when the gears 25 and 26 are used, since, when the gears 23ª and 24ª are both unmeshed, the gear 10 and its coöperating gears inside the drum are the only means for transmitting the motion of the driving shaft 1 to the driven shaft 3. Therefore, the four speeds that were mentioned as obtained through the use of the clutch 12 engaged with the drum, are not available for modification through the use of the gears 25 and 26. Lastly, by disengaging both of the clutches 11 and 12, leaving the gears inside the drum inoperative and simply driving the driven shaft 3 from the driving shaft 1 through the intermediary of the shaft 13, two more speeds are obtained, accordingly as the gear 23ª or the gear 24ª is meshed, making a final total of thirty-four different speeds obtained by the use of the device illustrated in Fig. 1.

In the device illustrated in Fig. 2, since there are only three combinations to be made between the intermediate shaft and the drum, only six speeds are had by manipulating the clutch 11, and three more by using the clutch 12, which, multiplied by using the change of gears 23 and 24, makes eighteen speeds. Then, by use of the gears 25 and 26, meshed together, to the exclusion of both the gears 23 and 24, the first six speeds are modified into six other speeds, making a total of twenty-four speeds. Finally, by excluding the gears inside the drum and driving simply through the intermediate shaft, as above explained in connection with the description of Fig. 1, the two speeds there available are used, making a final total of twenty-six different speeds obtained by the use of the device illustrated in Fig. 2.

It is evident from the above that it is only necessary to add or subtract combinations of the gears in any of the different parts of the device to devise apparatus of practically any range of speed variations, for various purposes. In any case, the number of speed changes attainable is exceedingly large relative to the number of gears and other mechanical details of the device, which is a marked advantage in itself, affording economy of construction and space, in addition to the fundamental advantage of efficiency in transmission peculiar to the employment of my novel principle above referred to. Another advantage, which results essentially from this novel principle of transmission, is the shifting of operative engagement from side to side of the teeth of the gears in the respective combinations. This is readily understood when it is considered that with the clutch 12 engaging the gear 10, the drum is being turned by the action of the gears inside it, reactively, and the drum, in turn, exerts an assisting action, through the intermediate shaft 13, on the driving shaft 1, but when the clutch 12 is engaging the drum, the turning of the drum is effected from the driving shaft 1 through the intermediate shaft, and the drum simply turns the driven shaft by direct action with it, instead of through the intermediary of the gears inside it, as in the other case, which caused the reaction above referred to as assisting the driving shaft through the intermediate shaft. This shifting of the bearing between the different sides of the teeth of the gears on the intermediate shaft, and on the drum and on the driving shaft, where the different gears mesh together is obviously advantageous in securing even wear, like that attained were the machine reversed repeatedly, but attained in connection with a constant direction of rotation of the various parts.

From the foregoing description it will be understood that various minor modifications are possible without departure from the scope and spirit of my invention, and, therefore, I do not wish to be understood as limiting myself to the herein contained exemplification of my invention, but

What I claim as new and desire to secure by Letters Patent is:

1. In variable speed mechanism, a driving shaft, a driven shaft, a movable reactive member, a change speed operative connection between the driving shaft and the driven shaft carried by said reactive member and means for eliminating said operative connection and connecting said reactive member directly to the driven shaft, and an operative connection between the reactive member and the driving shaft.

2. In variable speed mechanism, a driving shaft, a driven shaft coaxial with the driving shaft, a reactive member rotatable concentric with said shafts, a change-speed operative connection between said shafts carried by said reactive member, means for eliminating said operative connection and connecting said reactive member directly to said driven shaft, and an operative connection between the reactive member and the driving shaft.

3. In variable speed mechanism, shafts, a reactive member, the shafts being coaxial and the reactive member being concentric with them, a change-speed operative connection between the shafts carried by the reactive member, means for eliminating said operative connection and connecting the reactive member directly with one of said shafts, and an operative connection between the reactive member and the other of said shafts.

4. In a variable speed mechanism, a driving shaft, a driven shaft coaxial with the driving shaft, a reactive member rotatable concentric with said shafts, a change-speed operative connection between said shafts carried by said reactive member, means for varying the speed of the reactive member, means for changing the ratio of change of speed of said operative connection, means for eliminating said operative connection and connecting it directly with said reactive member and an operative connection between the reactive member and the driving shaft.

5. In a variable speed mechanism, a driving shaft, a driven shaft coaxial with the driving shaft, a reactive member rotatable concentric with said shafts, change-speed operative connection between said shafts carried by said reactive member, an intermediate shaft parallel with said shafts, a gear on the reactive member, a gear on the intermediate shaft in mesh therewith, another gear on the reactive member alternatively intermeshing with the aforementioned gears on the reactive member and the intermediate shaft respectively, means for controlling the speed of rotation of the intermediate shaft, whereby the speed of rotation of the reactive member may be varied, means for changing the ratio of change of speed of said operative connection carried by said reactive member, and means for eliminating said operative connection carried by the reactive member and connecting said reactive member directly with said driven shaft, substantially as set forth.

6. In a variable speed mechanism, the combination of a driving shaft, a driven shaft, and an intermediate shaft, a change-speed connection between the driving shaft and the driven shaft, an operative connection between the driven shaft and said operative connection, and means for connection of the intermediate shaft either to the driving shaft or the driven shaft, whereby the intermediate shaft may have variable control of said operative connection, means for eliminating said operative connection as a driving means between the driving shaft and the driven shaft and for connecting said driven shaft directly with the intermediate shaft through said operative connection, substantially as and for the purposes specified.

7. In a variable speed mechanism, a driving shaft, a driven shaft, a reactive drum, reactive shafts carried by the drum, stepped gears carried by the reactive shafts and forming a change-speed operative connection between the driving shaft and the driven shaft, an intermediate shaft, gears thereon, gears on the drum to selectively mesh with the gears on the intermediate shaft, gears on the driving shaft, gears on the intermediate shaft to selectively mesh with the gears on the driving shaft, a gear on the intermediate shaft and a gear on the driven shaft to mesh and unmesh, a clutch to connect the driven shaft with said operative connection or with the drum, and means for manipulating said clutch, substantially as and for the purposes specified.

8. In variable speed mechanism, a driving shaft, a driven shaft, a movable reactive member, a change-speed operative connection between the driving shaft and the driven shaft carried by said reactive member, means for eliminating said operative connection and connecting said reactive member directly to the driven shaft, or for eliminating said operative connection and leaving the reactive member disconnected from the driven shaft, an operative connection between the driving shaft and the reactive member and means for eliminating it, and an operative connection between the driven shaft and the reactive member and means whereby it may be eliminated.

9. In variable speed mechanism, a driving shaft, a driven shaft, a reactive drum, reactive shafts carried by the drum, stepped gears carried by the drum and forming change-speed operative connection between the driving shaft and the driven shaft, an intermediate shaft, gears thereon, gears on the drum to selectively mesh with the gears on the intermediate shaft, gears on the driving shaft, gears on the intermediate shaft to selectively mesh with the gears on the driving shaft, a gear on the driven shaft and a gear on the intermediate shaft to mesh and unmesh, a clutch to connect the driven shaft with said operative connection or with the drum, a clutch to connect said operative connection with the driving shaft, said clutches permitting said operative connection to be eliminated as a factor in the operation of the mechanism, substantially as and for the purposes specified.

10. In variable speed mechanism, a driving member, a driven member, means for reactively operatively connecting them, means for varying the reactive operation, means for eliminating the reactive operation, and means for utilizing part of the reactively operating means for directly connecting said members.

11. In variable speed mechanism, a driving member, a driven member, a movable reactive member and change-speed operative connection between the driving member and the driven member carried by said reactive member, means for eliminating said operative connection and an operative connection between the reactive member and the driving member.

12. In variable speed mechanism, a driving member, a driven member, a reactive member, an intermediate member to utilize the reaction of the reactive member on the driving member or on the driven member, alternatively, and means for eliminating the reactive member from operation with said other members and connecting the driving and driven members directly through the intermediate member.

13. In variable speed mechanism, a driving member, a driven member, movable reactive means, means for operatively connecting said reactive means either to said driven member or to said driving member, operative connection carried by said movable reactive means for operatively connecting said driving member and said driven member, and means for operatively connecting said members and eliminating the operation of said reactive means.

14. In variable speed mechanism, a driving shaft, a driven shaft, an intermediate shaft, a plurality of couples of gears operatively connecting the driving shaft to the intermediate shaft, alternatively, and a plurality of couples of gears operatively connecting the intermediate shaft to the driven shaft, alternatively, whereby different combinations of couples of gears, from driving to intermediate shaft and from intermediate shaft to driven shaft, respectively, may be formed and the respective ratios of speed-change of said couples thus combined may be compounded, and reactive change-speed operative connection, connecting either the driving or driven shaft with said intermediate shaft, alternatively, as a substitute for said couples of gears operatively connecting the respective shafts, in either instance.

ALPHEUS FAY.

Witnesses:
H. M. Fay,
J. W. Bannister.